(12) United States Patent
Choo et al.

(10) Patent No.: US 8,355,718 B2
(45) Date of Patent: Jan. 15, 2013

(54) RF4CE-BASED TERMINAL AND COMMUNICATION SYSTEM THEREOF

(75) Inventors: Hyun-Seung Choo, Gwacheon-si (KR); Dong-Ju Bae, Suwon-si (KR); Jae-Wan Seo, Suwon-si (KR); Hyun-Jin Kong, Suwon-si (KR); Tae-Young Kim, Suwon-si (KR)

(73) Assignee: Sungkyunkwan University Foundation for Corporate Collaboration, Suwon-Si (KR)

( * ) Notice: Subject to any disclaimer, the term of this patent is extended or adjusted under 35 U.S.C. 154(b) by 313 days.

(21) Appl. No.: 12/693,334

(22) Filed: Jan. 25, 2010

(65) Prior Publication Data

US 2011/0159871 A1 Jun. 30, 2011

(30) Foreign Application Priority Data

Dec. 24, 2009 (KR) ........................ 10-2009-0130885

(51) Int. Cl.
*H04W 4/00* (2009.01)
*H04L 12/28* (2006.01)

(52) U.S. Cl. ..................... 455/435.2; 370/338; 370/389; 370/392

(58) Field of Classification Search ............... 455/422.1, 455/434, 435.2, 426.1; 370/338, 389, 392; 340/539.22

See application file for complete search history.

(56) References Cited

U.S. PATENT DOCUMENTS

2007/0274270 A1* 11/2007 Jones et al. .................... 370/338
2008/0068156 A1* 3/2008 Shimokawa et al. ..... 340/539.22
2011/0269397 A1* 11/2011 Bella et al. .................... 455/11.1

OTHER PUBLICATIONS

Heo et al., "The Optimum Path Selection Mechanism for Inter-Pan Communication Using ZigBee", ICOIN, Jan. 2008.*
Wang et al., "Interworking between ZigBee/802.15.4 and IPv6/802.3 Network", IPv6 07, Aug. 2007.*
ZigBee Alliance, "ZigBee Control your world", ZigBee RF4CE Specification V1.00, Mar. 2009.*
Cuevas et al., "A proposal for Zigbee clusters interconnection based on Zigbee Extension Devices", IFIP International Federation for Information Processing, 2007, vol. 248/2007, pp. 227-238.*

* cited by examiner

*Primary Examiner* — Jinsong Hu
*Assistant Examiner* — Opiribo Georgewill
(74) *Attorney, Agent, or Firm* — Birch, Stewart, Kolasch & Birch, LLP

(57) ABSTRACT

A Radio Frequency for Consumer Electronics (RF4CE)-based terminal and a system therefor are disclosed. The system includes a plurality of terminals each having an RF4CE communication module, and at least one gateway for storing unique Identifier (ID) information and other ID information about a plurality of terminals within a predetermined area in a table and periodically transmitting the table externally.

6 Claims, 5 Drawing Sheets

RF4CE-BASED TERMINAL AND COMMUNICATION SYSTEM THEREOF

BACKGROUND OF THE INVENTION

1. Field of the Invention

The present invention relates to a Radio Frequency for Consumer Electronics (RF4CE)-based terminal and a communication system therefor, and more particularly, to local communication between terminals each having an RF4CE communication module, and communication between terminals each having an RF4CE communication module over an external communication network.

2. Description of the Related Art

The RF4CE Consortium, founded by major global home appliance manufacturers, agreed to work with the ZigBee alliance to jointly deliver a standardized specification for RF4CE in March, 2009. A core technology of future-generation home networking, RF4CE is designed to be deployed in a wide range of remotely-controlled audio/visual consumer electronics products, such as TVs, air conditioners, set-top boxes, and audio equipment. It is a protocol that allows for device-to-device communication and control in compliance with the Institute of Electrical and Electronics Engineers (IEEE) 802.15.4 standard.

Compared to conventional wireless communication technologies, RF4CE does not require any particular receiver and thus supports bi-directional wireless communication between a controller and a target device. Remote controls conforming to the RF4CE standard will replace IR remote controls and can operate devices freely from long distances regardless of obstacles, thereby overcoming the line-of-sight problem of IR remote controls. For example, the signal transmitter of a conventional IR remote control for a TV should be pointed towards the receiver of a TV in order to control the TV. In contrast, an RF4CE remote control conforming to IEEE 802.15.4 can control the operation of a TV in a living room from a bedroom because it offers non-line-of-sight operation.

One of big features of RF4CE is that one-to-one communication is possible without any base station or receiver. For example, RF4CE allows for bi-directional communication between home appliances like a TV and a refrigerator without the need for installing a base station between them.

Accordingly, research and development is underway in anticipation that a future remote control will have a plurality of device profiles registered inside such that a user may remotely control a plurality of devices using a single remote control and further, the remote control of the future will even act as a communication convergence device such as a mobile phone.

In communication systems that provide portable phone services, data communication such as Short Message Service (SMS) messages is always conducted through the servers of service providers and charged per message. For example, when an SMS message is transmitted to a mobile terminal using a portable phone service or a communication terminal using an Internet telephony system, a fixed fee should be paid per SMS message.

SUMMARY OF THE INVENTION

The present invention has been made in view of the above problems, and it is an object of the present invention to provide a system for conducting communication between RF4CE-based terminals. Particularly, a system for enabling direct communication between RF4CE-based terminals over an external communication network such as a Transmission Control Protocol/Internet Protocol (TCP/IP) network is provided.

It is another object of the present invention to provide a terminal that operates in the system.

To achieve the above and other objects, the present invention provides a system for conducting communication between RF4CE-based terminals, including a plurality of terminals each having an RF4CE communication module, and at least one gateway for storing unique Identifier (ID) information and other ID information about a plurality of terminals within a predetermined area in a table and periodically transmitting the table externally.

The system may further include a central control server connected to the at least one gateway over a communication network, for storing the table received from the at least one gateway.

Each of the terminals may be a mobile communication terminal capable of voice and video calls and accommodating a Universal Subscriber Identity Module (USIM) card, and the RF4CE communication module may be installed in the USIM card.

Upon receipt of a signal requesting communication with a target terminal from a terminal, the at least one gateway may determine whether information about the target terminal is included in the table, and upon detection of the information about the target terminal in the table, it may transmit other ID information about the target terminal to the terminal.

Alternatively if the information about the target terminal is not detected in the table, it may transmit a signal requesting the information about the target terminal to the central control server, receive the information about the target terminal from the central control server, transmit the information about the target terminal to the terminal, receive communication data from the terminal, and transmit the communication data to the target terminal.

The information about the target terminal received from the central control server may include ID information about a target gateway connected to the target terminal and other ID information about the target terminal, and the at least one gateway may receive the communication data from the terminal and transmit the communication data to the target gateway over a communication network.

The communication network may be a Transmission Control Protocol/User datagram Protocol (TCP/UDP) network.

In accordance with the present invention, the above and other objects can be accomplished by the provision of a terminal using an RF4CE communication network, including an RF4CE communication module, a memory for storing unique ID and other ID information about a plurality of other terminals within a predetermined area in a table, and a controller for externally transmitting the table periodically.

Upon receipt of a signal requesting communication with a target terminal from another terminal, the controller may determine whether there is information about the target terminal in the table and, upon detection of the information about the target terminal in the table, the controller may transmit other ID information about the target terminal to the requesting terminal.

If the information about the target terminal is not detected in the table, the controller may externally transmit a signal requesting the information about the target terminal over the RF4CE communication network, receive the information about the target terminal externally over the RF4CE communication network, transmit the information about the target terminal to the requesting terminal, receive communication data from the requesting terminal, and transmit the received communication data toward the target terminal.

The terminal may be a mobile communication terminal capable of voice and video calls and accommodating a USIM card, and the RF4CE communication module is installed in the USIM card.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
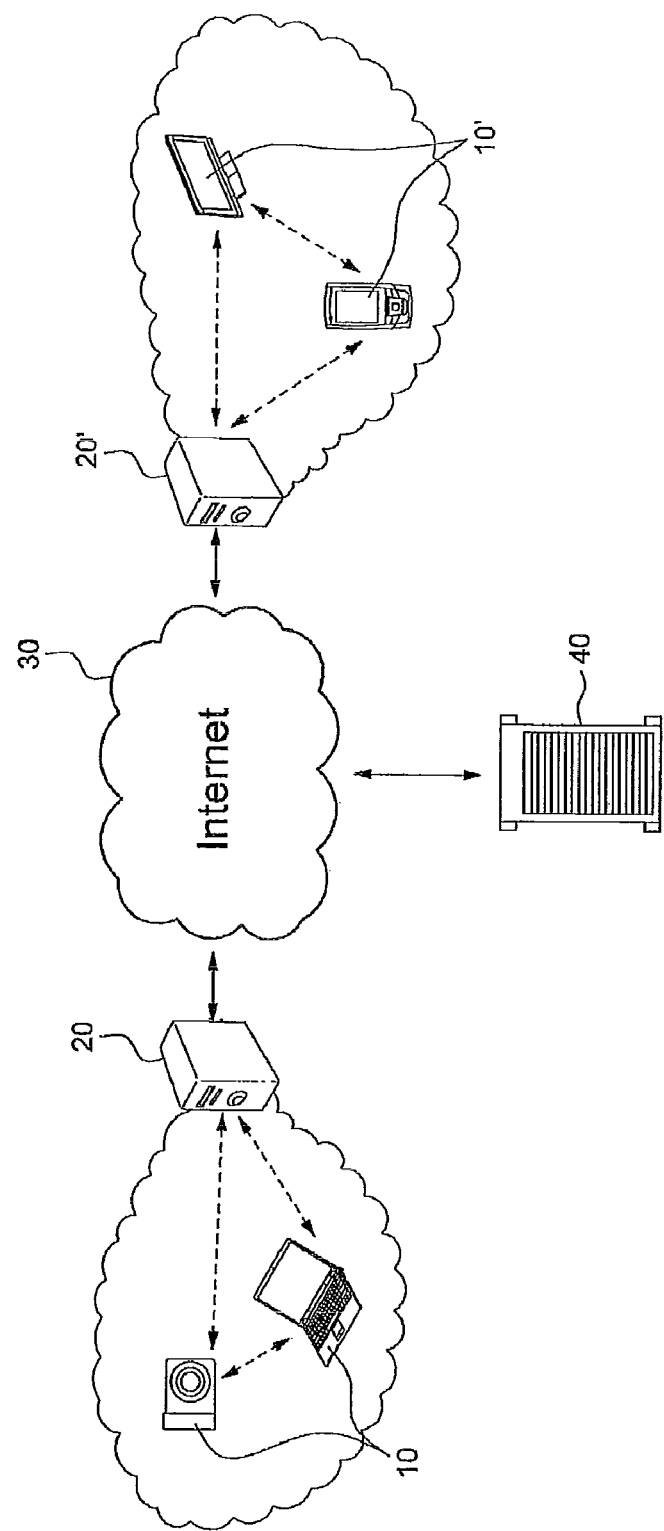
FIG. 1 illustrates a configuration of a Radio Frequency for Consumer Electronics (RF4CE) communication system according to an exemplary embodiment of the present invention.

The contents of the description, such as the detailed construction and specific elements, are provided to assist in a comprehensive understanding of the embodiments of the invention. Accordingly, those of ordinary skill in the art will recognize that various changes and modifications of the embodiments described herein can be made without departing from the scope and spirit of the present invention.

The terms used herein, including ordinal numbers such as "first" and "second" are merely used to describe, and not to limit, various components. The terms simply distinguish the components from one another. For example, a second component may be referred to as a first component and the first component may be referred to as the second component, within the scope and spirit of the present invention.

Also, when it is said that a component is "connected" or "linked" to another component, it should be understood that the former component may be directly connected or linked to the latter component or a third component may be interposed between the two components. However, if a component is "directly connected" to another component, it should be understood that the components are connected without an intervening component.

Specific terms used in the present application are used simply to describe specific exemplary embodiments, without limiting the present invention. A singular covers a plural representation unless the context indicates otherwise. The terms "include" or "have" should be understood to indicate the presence of a feature, numeral, step, operation, component, part, or a combination thereof, not excluding the presence or probability of the presence of one or more other features, numerals, steps, operations, components, parts, or a combination thereof.

With reference to the attached drawings, a Radio Frequency for Consumer Electronics (RF4CE)-based terminal and a communication system therefor will be described in detail. Like reference numerals denote the same components and descriptions of well-known functions and constructions are omitted for clarity and conciseness.

FIG. 1 illustrates a configuration of an RF4CE communication system according to an exemplary embodiment of the present invention.

Referring to FIG. 1, the RF4CE communication system for conducting communication between RF4CE-based terminals includes a plurality of mobile terminals 10 and 10', such as a digital camera, a laptop computer, a portable phone, a TV, etc., each equipped with an RF4CE communication module; gateways 20 and 20' for recording unique Identifier (ID) information and other ID information about each terminal 10 or 10' in a table and externally transmitting the values of the table periodically; an Internet 30; and a central control server 40 connected to the plurality of gateways 20 and 20' over the Internet 30, for recording the unique ID information and other ID information about the terminals 10 and 10' on a gateway basis, and upon receipt of a request for communication with one gateway, for example, a request for Short Message Service (SMS) message transmission to one gateway from another gateway, searching the unique ID information and other ID information about the terminals 10 and 10' and transmitting gateway information, unique ID information, and other ID information about a matching terminal to the requesting gateway.

An RF4CE communication module may be installed in a digital camera, a laptop computer, etc. In case of a portable phone having a Universal Subscriber Identity Module (USIM), the RF4CE module may be mounted in the USIM, for operation in the portable phone.

While certain entities are named the gateways 20 and 20' in this exemplary embodiment, it may be further contemplated that some terminals having RF4CE communication modules act as gateways. This depends on the initial settings. For instance, if an RF4CE communication module is installed in each of a remote control, an interphone for home automation, a robot cleaner, and a TV, the interphone for home automation may be set as a gateway in a communication system according to an exemplary embodiment of the present invention.

Figure 2:
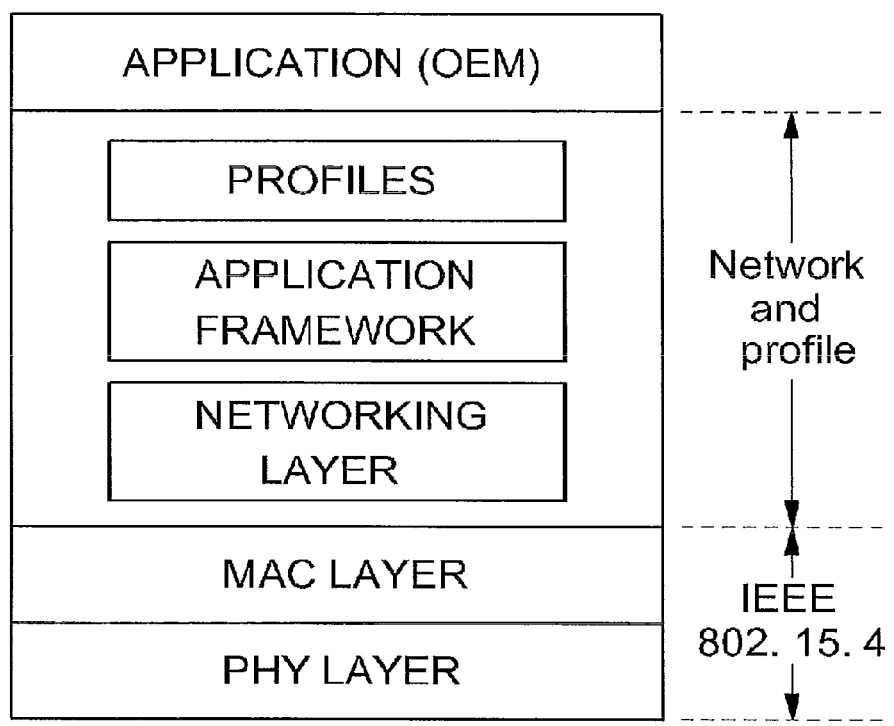
FIG. 2 illustrates a protocol stack for RF4CE communication according to an exemplary embodiment of the present invention.

FIG. 2 illustrates a protocol stack for RF4CE communication according to an exemplary embodiment of the present invention. Referring to FIG. 2, a PHYsical (PHY) layer and a Medium Access Control (MAC) layer are configured in compliance with the Institute of Electrical and Electronics Engineers (IEEE) 802.15.4 standard in a protocol stack of an RF4CE communication module. A networking layer for defining networks and profiles, an application framework layer, and a profiles layer are positioned above the MAC layer. Preferably, specific operations between RF4CE layers conform to a standard opened through an open Web site.

Figure 3:
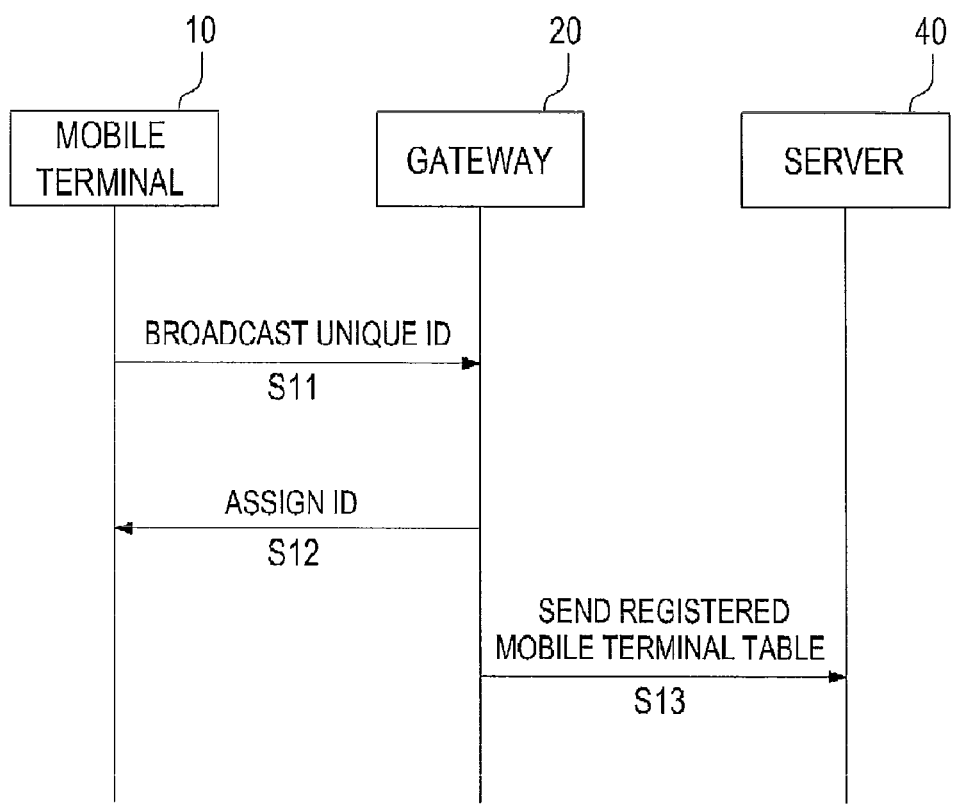
FIG. 3 is a diagram illustrating a signal flow for registering an RF4CE-based terminal to a gateway according to an exemplary embodiment of the present invention.

FIG. 3 is a diagram illustrating a signal flow for registering an RF4CE-based terminal to a gateway, that is, for registering the RF4CE-based terminals 10 to the gateways 20 according to an exemplary embodiment of the present invention.

Referring to FIG. 3, when each terminal 10 broadcasts its unique ID information in step S11, a gateway 20 receives the unique ID information from the terminal 10 and assigns an ID corresponding to a unique ID of the terminal 10, such as a port number, to the terminal 10 by transmitting ID information in step S12.

An application uses a port number for communication by a protocol such as Transmission Control Protocol (TCP) or User Datagram Protocol (UDP). Port numbers are used widely. Preferably, the gateway 20 or 20' assigns a port number other than well-known port numbers to the terminal 10 or 10'.

The local area of the gateway 20 or 20' may cover a radius of 10 or fewer meters according to the RF4CE standard. Accordingly, the gateway 20 or 20' stores the unique ID information and other ID information about a plurality of terminals within its local area in a table and requests the server 40 to store the table by transmitting the table to the server 40 in step S13.

Figure 4:
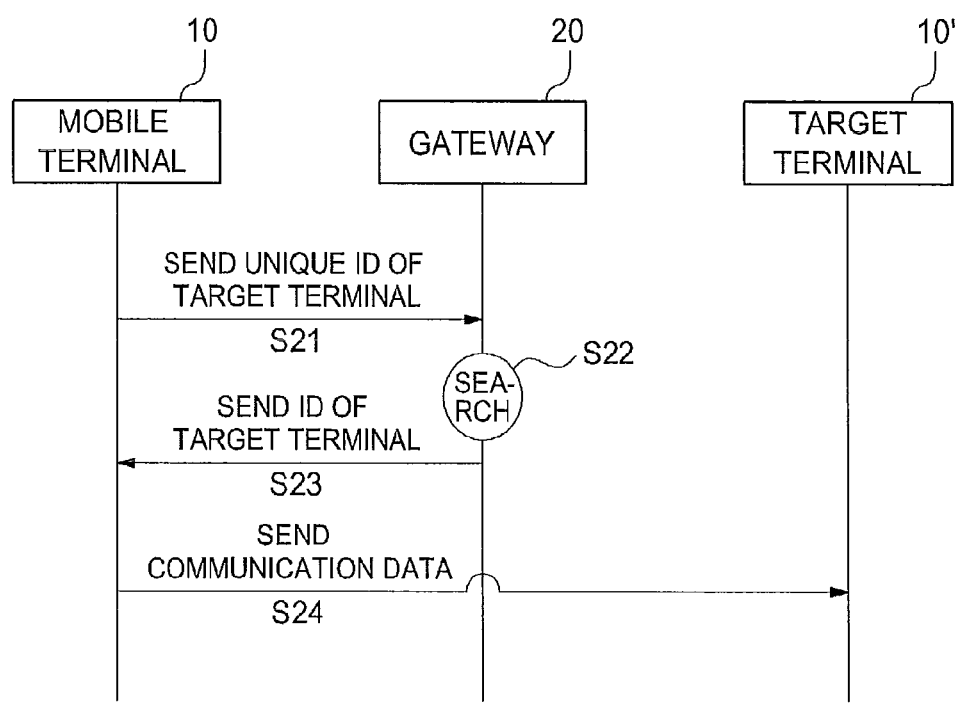
FIG. 4 is a diagram illustrating a signal flow for performing local communication between RF4CE-based terminals according to an exemplary embodiment of the present invention.

FIG. 4 is a diagram illustrating a signal flow for performing local communication between RF4CE-based terminals according to an exemplary embodiment of the present invention.

Referring to FIG. 4, in the communication system including the terminals 10 and 10' and the gateways 20 and 20', when a terminal intends to transmit an SMS message to another terminal within the same local area, for example, when a user wants to transmit an SMS message to a laptop computer 10 through a digital camera 10 in the illustrated case of FIG. 1, the digital camera 10 transmits a communication request signal including unique ID information about the laptop computer 10 to the gateway 20 in step S21. Upon receipt of the communication request signal, the gateway 20 determines whether the laptop computer 10 was registered to the table by searching the table in step S22 and transmits local ID information (i.e. port number) about the laptop computer 10 to the digital camera 10 in step S23. The digital camera 10 receives the port number of the laptop computer 10 and transmits the SMS message directly to the port number of the laptop computer 10 in step S24. The laptop computer 10 may display the received SMS message to the user. To display the SMS message, the laptop computer 10 may need an additional application.

Figure 5:
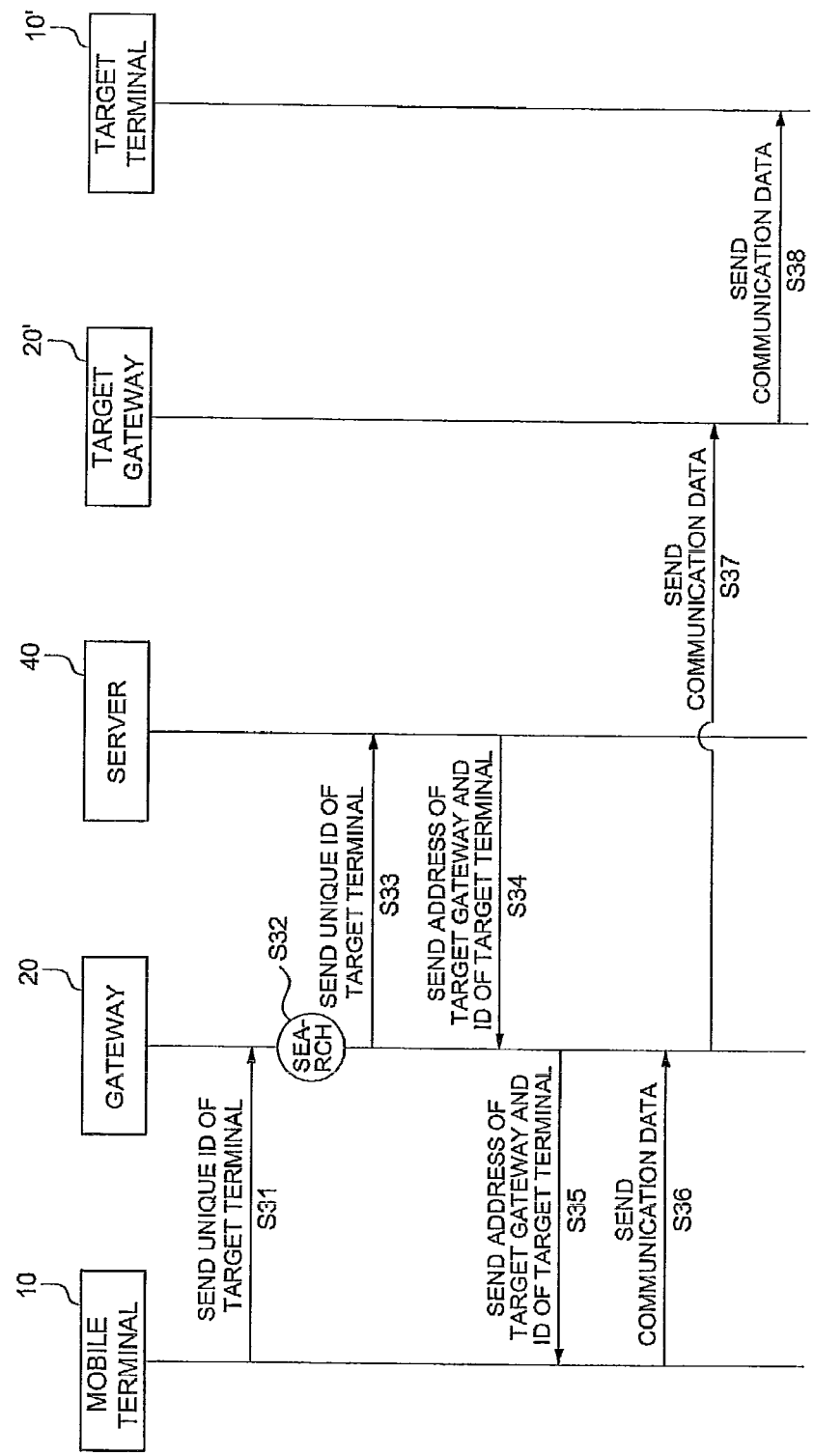
FIG. 5 is a diagram illustrating a signal flow for performing communication between RF4CE-based terminals over an external network according to an exemplary embodiment of the present invention.

Meanwhile, if the digital camera 10 on the left side of FIG. 1 intends to transmit an SMS message to a TV 10' on the right side of FIG. 1, that is, if terminals are to communicate with each other through different gateways over the Internet, the procedure illustrated in FIG. 5 is performed.

FIG. 5 is a diagram illustrating a signal flow for performing communication between RF4CE-based terminals over an external network according to an exemplary embodiment of the present invention.

Referring to FIG. 5, the digital camera 10 transmits an SMS transmission request signal including unique ID information about the TV 10' to the gateway 20 in step S31. Upon receipt of the SMS transmission request signal, the gateway 20 determines if there is unique ID information about the TV 10' in its table by searching the table in step S32. Upon confirming the absence of the unique ID information about the TV 10', the gateway 20 transmits a communication request signal including the unique ID information about the TV 10' to the server 40 in step S33. The server 40, which preserves information about the terminals 10 and 10' registered through the gateways 20 and 20', transmits an address of the gateway 20' corresponding to the unique ID information for the TV 10' and other ID information about the TV 10' to the requesting gateway 20 in step S34. The requesting gateway 20 transmits the received address of the gateway 20' and the other received ID information about the TV 10' to the digital camera 10 in step S35. The digital camera 10 transmits a request signal including the address of the target gateway 20', the other ID information about the TV 10', and SMS data to the gateway 20 in step S36.

The gateway 20 detects the address of the target gateway 20' in the received request signal and transmits the SMS data and the other ID information about the TV 10' to the gateway 20' at the address in step S37.

The target gateway 20' transmits the received SMS data to the TV 10' and thus the TV 10' can display the SMS data to a user in step S38.

Even when the above SMS transmission is requested while the target terminal, that is, the TV 10' is moving to the local area of another gateway, the TV 10' registers its unique ID and other ID information to the gateway in the procedure of FIG. 3 and receives the SMS message in the procedure of FIG. 5.

Each of the RF4CE-based terminals 10 and 10' includes an RF4CE communication module, a memory, and a controller. Thus each terminal 10 or 10' may serve as a gateway 20 or 20' depending on its setting. The gateways 20 and 20' may store tables in their memories and their controllers may transmit the tables to the server 40 periodically.

As is apparent from the above description, a terminal can transmit, for example, an SMS message to another terminal over an RF4CE communication network without the intervention of a service provider according to the exemplary embodiments of the present invention.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for conducting communication between Radio Frequency for Consumer Electronics (RF4CE)-based terminals, the system comprising:
a plurality of terminals, each having an RF4CE communication module;
at least one gateway for storing unique Identifier (ID) information and other ID information about a plurality of terminals within a predetermined area in a table and periodically transmitting the table externally; and
a central control server connected to the at least one gateway over a communication network, for storing the table received from the at least one gateway,
wherein upon receipt of a signal requesting communication with a target terminal from a terminal, the at least one gateway determines whether information about the target terminal is included in the table, and if the information about the target terminal is not detected in the table, transmits a signal requesting the information about the target terminal to the central control server, receives the information about the target terminal from the central control server, transmits the information about the target terminal to the terminal, receives communication data from the terminal, and transmits the communication data to the target terminal.

2. The system according to claim 1, wherein at least two of the plurality of terminals attempt to communicate, wherein each of the at least two terminals attempting to communicate is a mobile communication terminal capable of voice and video calls and comprise a Universal Subscriber Identity Module (USIM) card, and wherein the RF4CE communication module is a component of the USIM card.

3. The system according to claim 1, wherein upon receipt of a signal requesting communication with the target terminal from a source terminal, the at least one gateway determines whether information about the target terminal is included in the table, and upon detection of the information about the target terminal in the table, the at least one gateway transmits other ID information about the target terminal to the source terminal.

4. The system according to claim 1, wherein the communication network is a Transmission Control Protocol/User Datagram Protocol (TCP/UDP) network.

5. The system according to claim 3, wherein the signal requesting communication is a Short Message Service (SMS) message transmission request signal.

6. The system according to claim 1, wherein the information about the target terminal received from the central control server includes ID information about a target gateway connected to the target terminal and other ID information about the target terminal, and the at least one gateway receives the communication data from the terminal and transmits the communication data to the target gateway over a communication network.

* * * * *